(12) United States Patent
Liu

(10) Patent No.: US 8,380,239 B2
(45) Date of Patent: Feb. 19, 2013

(54) ANTENNA TRANSMITTING POWER MONITORING AND/OR CONTROLLING

(75) Inventor: Jigang Liu, Shaanxi (CN)

(73) Assignee: Empire Technology Development LLC, Wilmington, DE (US)

( * ) Notice: Subject to any disclaimer, the term of this patent is extended or adjusted under 35 U.S.C. 154(b) by 388 days.

(21) Appl. No.: 12/707,523

(22) Filed: Feb. 17, 2010

(65) Prior Publication Data

US 2011/0053632 A1    Mar. 3, 2011

(30) Foreign Application Priority Data

Aug. 25, 2009  (CN) .......................... 2009 1 0167460

(51) Int. Cl.
*H04B 7/00* (2006.01)
*H04Q 7/20* (2006.01)

(52) U.S. Cl. ........ 455/522; 455/13.4; 455/9; 455/67.11; 455/115.1

(58) Field of Classification Search .................. 455/522, 455/13.4, 9, 66.1, 67.11, 68, 115.1, 127.1
See application file for complete search history.

(56) References Cited

U.S. PATENT DOCUMENTS

| 5,307,514 | A * | 4/1994 | Gagnon ......................... 455/281 |
| 5,548,820 | A * | 8/1996 | Victorin ..................... 455/67.14 |
| 6,018,650 | A * | 1/2000 | Petsko et al. ............... 455/234.1 |
| 6,178,310 | B1* | 1/2001 | Jeong, II ..................... 455/67.11 |
| 6,625,428 | B1  | 9/2003 | Finnell et al. |
| 2002/0173270 | A1* | 11/2002 | Buer ............................. 455/13.4 |
| 2007/0030336 | A1* | 2/2007 | Hoshigami et al. ......... 348/14.01 |
| 2007/0149146 | A1* | 6/2007 | Hwang et al. .................. 455/80 |
| 2008/0311864 | A1* | 12/2008 | Wallis ........................ 455/115.1 |

FOREIGN PATENT DOCUMENTS

CN  1159278 A  9/1997
CN  1993900 A  7/2007

* cited by examiner

*Primary Examiner* — Tuan Pham
(74) *Attorney, Agent, or Firm* — Brundidge & Stanger, P.C.

(57) ABSTRACT

A method and system for controlling the transmitting power of an antenna is provided, the system including a detecting device directly receiving signals from the antenna, the detecting device configured to obtain a voltage standing wave ratio of the antenna; and a control device coupled to the detecting unit. The control device includes a monitoring unit configured to calculate a real transmitting power value of the antenna based on the voltage standing wave ratio; a comparing configured to compare the real transmitting power value with an expected power value to generate an error value; and an adjusting unit configured to output a power adjusting signal for controlling the transmitting power of the antenna based on the error value.

18 Claims, 2 Drawing Sheets

ANTENNA TRANSMITTING POWER MONITORING AND/OR CONTROLLING

BACKGROUND

In a wireless communication system, an indoor unit and an outdoor unit of a base station are typically located away from each other. For example, a base transceiver station (BTS) is generally the indoor unit located inside a building, and an antenna is the outdoor unit located outside above the ground on a rooftop. Usually, a RF signal generated and outputted from the indoor unit is transmitted to the outdoor unit via a cable, jumper and the like for transmission of the communication signal. When a malfunction or an error occurs within the wireless communication system, it may be difficult to locate or pinpoint where the malfunction or error occurred. Often times, it requires a technician to disassemble the transmission line and climb to the upper location to do on site measurements, which may be dangerous and risky.

In addition, a RF remote module being employed in a wireless communication system becomes more and more popular in order to improve system performance. Therefore, when a RF remote module experiences any problem, it is necessary to locate and evaluate the problem of the module.

In an existing base station of a wireless communication, an antenna is connected to an indoor unit of a base station via a feeder cable, and in the indoor unit, there is an antenna monitoring unit to monitor the performance of the antenna. In such a circumstance, when the antenna monitoring unit finds that there is something wrong, it is difficult to differentiate whether the antenna or the feeder cable is the source of error/malfunction, since the antenna is connected via the feeder cable and performance parameters of the antenna are monitored via the feeder cable. Similar to a defect in the antenna, a defect in the feeder cable may also dramatically change the measuring result in the antenna monitoring unit when measuring reflecting power of the antenna.

SUMMARY

A system is described in the present disclosure which includes a control device coupled to a detecting unit and comprising a monitoring unit configured to calculate a real transmitting power value of an antenna based on a voltage standing wave ratio of the antenna received from the detecting unit a comparing unit configured to compare the real transmitting power value with an expected power value to generate an error value; and an adjusting unit configured to output a power adjusting signal for controlling the transmitting power of the antenna based on the error value.

Alternatively, a device is described in the present disclosure including a detecting device configured to receive signals directly from an antenna, and further configured to obtain a voltage standing wave ratio of the antenna based on the received signals; and a processing unit to process the received signals and determine a performance of the antenna based on the detected voltage standing wave ratio of the antenna.

The present disclosure further describes a method for controlling the transmitting power of an antenna. The method includes receiving at least one signal directly from an antenna; and obtaining voltage standing wave ratio of the antenna based on the received signals.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
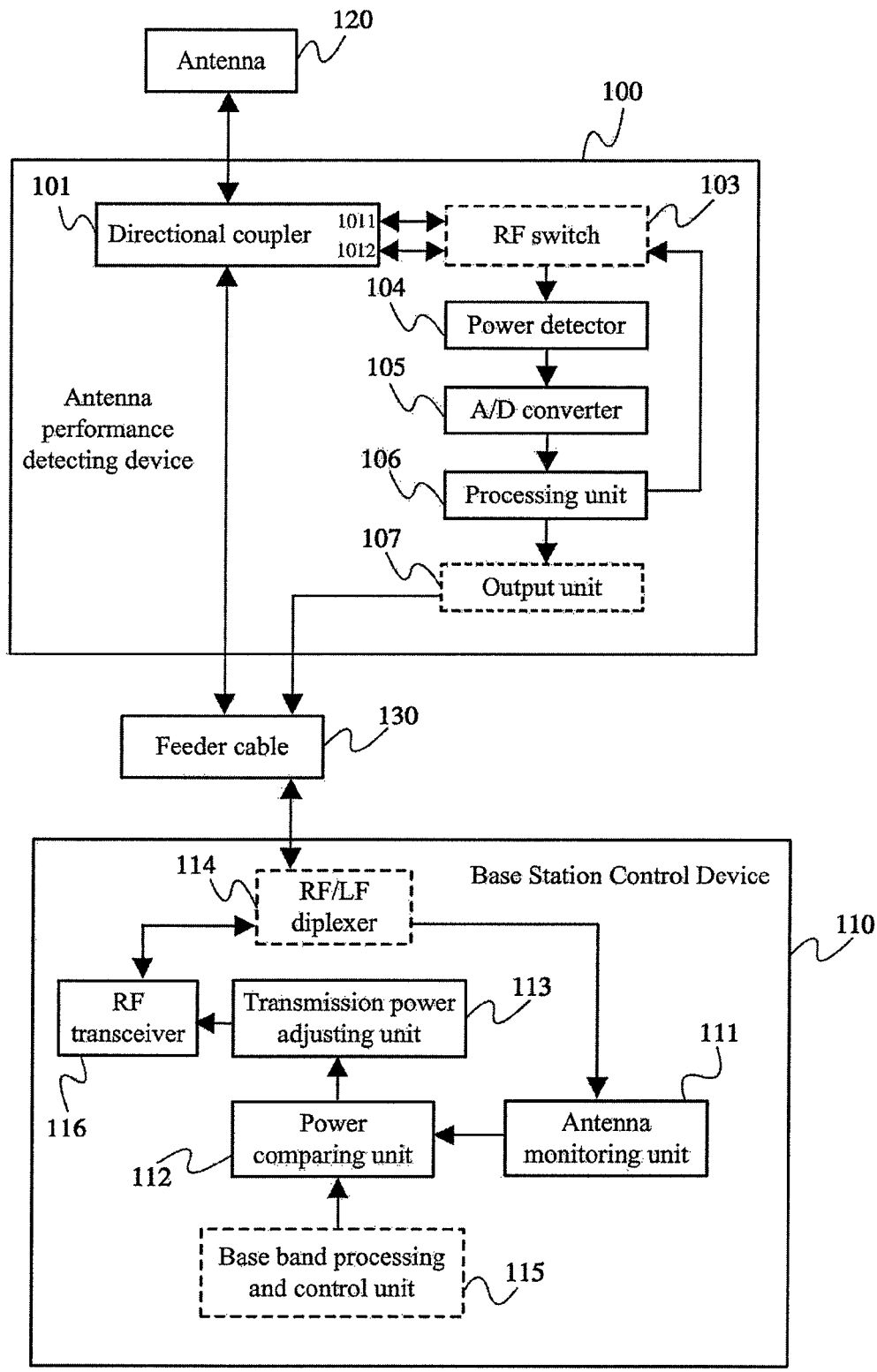
FIG. 1 illustrates a block diagram of a system for controlling the transmitting power of an antenna in a wireless communication system according to an embodiment of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

The disclosure is drawn, inter alia, to methods and systems related to antenna performance detection and transmitting power control. For example, the present disclosure provides an outdoor unit, i.e. an antenna performance detecting device, that may be positioned next to the antenna thus may receive signal directly from an antenna. The outdoor unit is located between the antenna and a feeder cable, and is for accurately detecting the performance status of the antenna. The present disclosure also provides an indoor unit, i.e. a base station control device, including an antenna monitoring unit, a power comparing unit, a transmitting power adjusting unit and a radio frequency transceiver, which controls the transmitting power of the antenna.

FIG. 1 illustrates a block diagram of a system for controlling the transmitting power of an antenna in a wireless communication system according to an embodiment of the present disclosure.

In FIG. 1, it is further shown an antenna performance detecting device 100 which may be located as an outdoor unit and connected between an antenna 120 and a feeder cable 130, and further connected to a base station control device 110, which is located in an indoor unit, via the feeder cable 130. The antenna performance detecting device 100 may be physically positioned next to the antenna 120 without any feeder cable between the antenna performance detecting device 100 and the antenna 120.

The antenna performance detecting device 100 of FIG. 1 may include but is not limited to a directional coupler 101, a power detector 104, an analog-digital (A/D) converter 105, and a processing unit 106.

The directional coupler 101 of FIG. 1 may be a bidirectional coupler and thus may generate coupled signals based on signals transmitted to and/or from the antenna 120. The directional coupler 101 may have four ports. Two of these ports allow the coupler 101 to be connected between the antenna 120 and the feeder cable. The other two of these ports of the coupler 101 may be two coupled signal output ports, a coupled transmitting signal output port 1011 and a coupled reflecting signal output port 1012. The directional coupler 101 is coupled via the coupled transmitting signal output port 1011 and the coupled reflecting signal output port 1012 to one or more input ports of the power detector 104. The power detector 104 receives the coupled signals through the respective one of the output ports 1011 and 1012 from the directional coupler 101, and generates analog detecting results. The power detector 104 is further connected to the A/D converter 105, and outputs the analog detecting results to the A/D converter 105. The A/D converter 105 converts the analog detecting results into digital results. The A/D converter 105 is connected to the processing unit 106, and outputs the digital results to the processing unit 106. The processing unit 106 processes the received digital results to generate processing results.

Alternatively, the antenna performance detecting device 100 of FIG. 1 optionally includes a radio frequency (RF) switch 103 which is configured to couple to both the directional coupler 101 and the power detector 104. The RF switch 103 may include two output ports and one input port. The power detector 104 is configured to receive signals from the directional coupler 101 in response to the RF switch 103 being switched to one of the output ports 1011 and 1012 of the directional coupler 101.

Alternatively, the antenna performance detecting device 100 of FIG. 1 optionally includes an output unit 107 which is coupled to the processing unit 106, configured to receive signals generated by the processing unit 106, and output the same to the base station control device 110 via the feeder cable 130 for further processing.

The antenna 120 of FIG. 1 may be considered as an outdoor unit of the base station in a wireless communication system. The directional coupler 101 may typically be but not limited to a low insertion loss coupler. The number of the directional coupler 101 is not limited to "one", it may be any number such as two, three, four and the like. Attenuation ratio provided by the coupling operation of the directional coupler 101 may be designed such that the power of the signals outputted to the power detector 104, such as signals generated by coupling the signals transmitted to/from the antenna 120, falls within the detecting range of the power detector 104, e.g. −10~−70 dBm. The RF switch 103, the power detector 104, the A/D converter 105 and the processing unit 106 may typically be realized by those skilled in the art, in which the processing unit 106 may be but not limited to a microprocessor. The number of the output ports of the directional coupler 101 and the input ports of the RF switch 103 are not limited to the above, which may be any number as long as the present disclosure may be realized. Alternatively, the RF switch 103 may be integrated with the power detector 104, the A/D converter 105 may be integrated with the power detector 104 or the processing unit 106, and the output unit 107 may be integrated with the processing unit 106.

In FIG. 1, the processing unit 106 is further configured to initiate the whole operation of the antenna performance detecting unit 100. Alternatively, the processing unit 106 is further configured to control the operations of all elements of the antenna performance detecting device 100 including the RF switch 103. Alternatively, the antenna performance detecting unit 100 may be designed to constantly run to perform the detection depending on specific application. Alternatively, the output unit 107 may output results generated by the processing unit 106 via an antenna cable, a separate wire/line, a wireless connection or the like to an unit outside the antenna performance detecting unit 100 for further processing or displaying, or output the results directly on site in audio or graphic format with an audio device or a displaying device.

The base station control device 110 of FIG. 1 typically includes but is not limited to an antenna monitoring unit 111, a power comparing unit 112, a transmitting power adjusting unit 113, and a radio frequency (RF) transceiver 116.

The antenna monitoring unit 111 is coupled to the feeder cable 130 and the power comparing unit 112, and is configured to receive the signals from the feeder cable 130, process the signals and send the processed signals to the power comparing unit 112. In one embodiment, the antenna monitoring unit 111 may be connected to the processing unit 106 or the output unit 107 via other wired or wireless link than the feed cable 130. The power comparing unit 112 is further coupled to the transmitting power adjusting unit 113, and is configured to compare the signals received from the antenna monitoring unit 112 with an expected power value, and send the comparison result to the transmitting power adjusting unit 113. Alternatively, the power comparing unit 113 may be configured to calculate and/or store the expected power value in advance for the comparison. The transmitting power adjusting unit 113 is further connected to the RF transceiver 116, and is configured to generate a power adjusting signal based on the comparison result, and send the power adjusting signal to the RF transceiver 116. The RF transceiver 116 is configured to generate transmitting signals with appropriate power based on the power adjusting signal.

Alternatively, the base station control device 110 optionally includes a radio frequency (RF)/low frequency (LF) diplexer 114 which is coupled among the feeder cable 130, the antenna monitoring unit 111 and the RF transceiver 116, and is configured to receive signals from the feeder cable 130 and send the received signals to the antenna monitoring unit 111. The RF/LF diplexer 114 is further configured to receive transmitting signals generated by the RF transceiver 116 then transmit the transmitting signals to the feeder cable 130.

Alternatively, the base station control device 110 optionally includes a base band processing and control unit 115 which is configured to provide the expected power value to the power comparing unit 112.

The whole operation of the antenna performance detecting device 100 may be powered by DC supplied from the base station control device 110 through the feeder cable 130 in the same way as that an outdoor antenna side amplifier is powered, which may be readily implemented by those skilled in the art.

The manner of connections among all elements (units) of the disclosure is not limited to the above description. Other connection arrangements may be applicable in the disclosure as long as the arrangements can be realized by those skilled in art to make the solution of the disclosure work.

Figure 2:
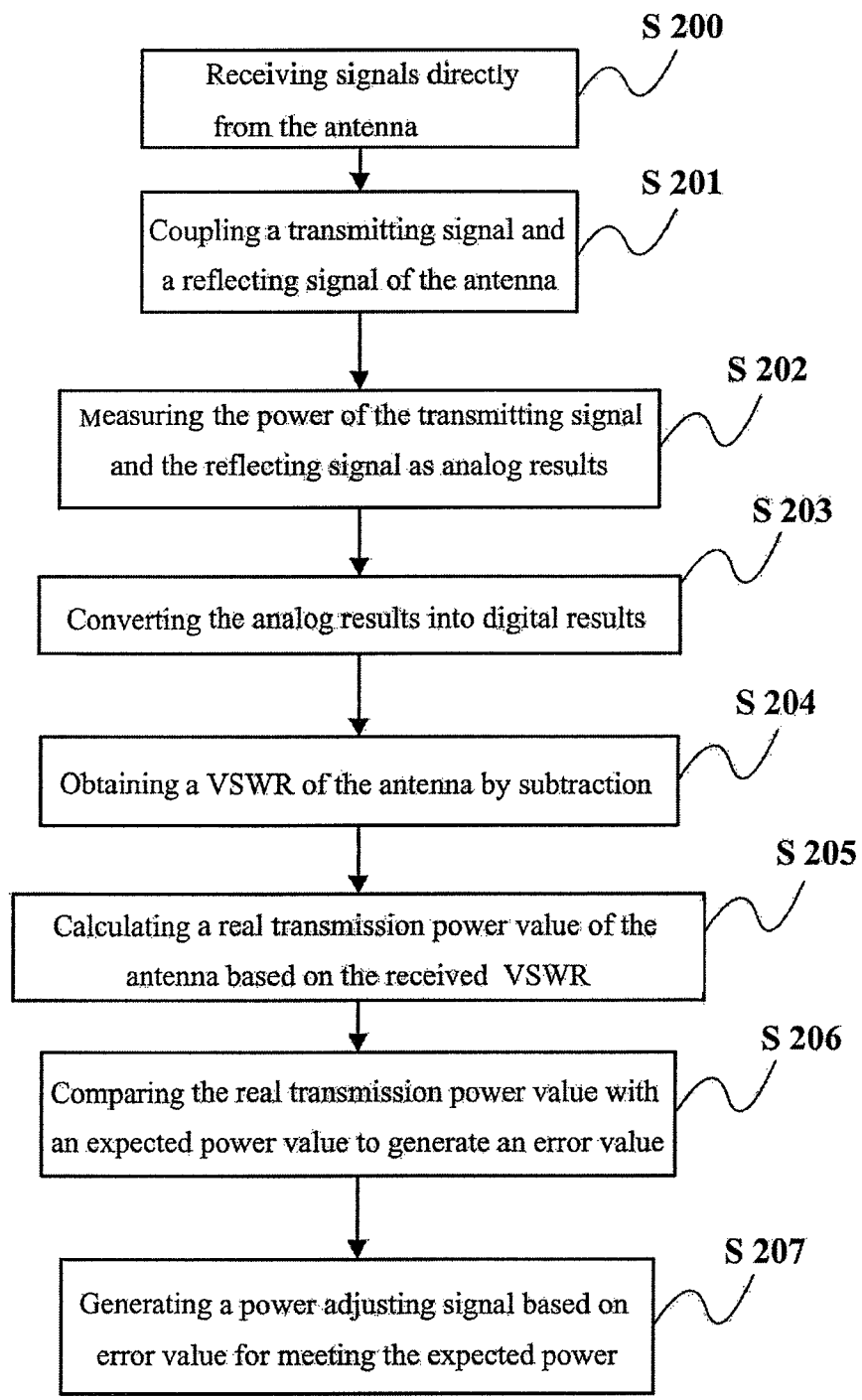
FIG. 2 illustrates a flow chart of a method of monitoring and controlling the transmitting power of an antenna in a wireless communication system according to an embodiment of the present disclosure.

FIG. 2 illustrates a flow chart of a method of monitoring and controlling the transmitting power of an antenna in a wireless communication system according to an embodiment of the present disclosure.

In the step S200 of FIG. 2, a detecting device may be positioned next to the antenna. In this configuration, the detecting device may receive signal directly from the antenna. In such a way, the detecting device may directly detect signals from the antenna without any interference of other connectors such as a feeder cable. In the step S201 of FIG. 2, a transmitting signal transmitted to an antenna is coupled, and a reflecting signal generated from the antenna is coupled. Since not all the power of the transmitting signal may be emitted out to space by the antenna, the power bounced back from the antenna forms the reflecting signal. In the step S202, the power of the transmitting signal is measured as an analog result, and the power of the reflecting signal is measured as another analog result. Furthermore, in the step S203, the analog result is converted into a digital result, which may be saved as a value A, and the another analog result is converted into another digital result, which may be saved as a value B. In the step S204, a voltage standing wave ratio (VSWR) of the antenna is calculated based on the value A and the value B, for example by subtracting the value B from the value A when both of the values are in dBm. The difference A-B has a corresponding relationship with the VSWR as appreciated by those skilled in art, therefore the detail of which is omitted here. In the step S205, a real transmitting power value of the antenna is calculated on a basis of the VSWR. In the step S206, the real transmitting power value is compared with an expected power value to generate an error value. In addition, in the step S207, a power adjusting signal is obtained on a basis of the error value for controlling the transmitting power of the antenna to meet the expected power.

In accordance with an illustrative embodiment, the above method may be realized by the antenna performance detecting device 100 and the base station control device 110 of FIG. 1. Specifically, the antenna performance detecting device 100 may be positioned next to the antenna 120 without any feeder cable between the antenna performance detecting device 100 and the antenna 120. In such a way, the antenna performance detecting device 100 may directly receive signals from the antenna 120 without any interference of the feeder cable 130. The above step S201 may be performed by the directional coupler 101 and the RF switch 103, in which the directional coupler 101 couples a transmitting signal transmitted to the antenna 120 and a reflecting signal generated from the antenna 120, and outputs the coupled transmitting signal of the antenna 120 to the power detector 104 through the RF switch 103 in response to the RF switch 103 being switched to the coupled transmitting signal output port 1011 of the directional coupler 101 under the control of the processing unit 106. Directional coupler 101 outputs the coupled reflecting signal of the antenna 120 to the power detector 104 through the RF switch 103 in response to the RF switch 103 being switched to the coupled reflecting signal output port 1012 of the directional coupler 101 under the control of the processing unit 106. Alternatively, the above step S201 may be performed by the directional coupler 101 without the RF switch 103, in which the directional coupler 101 outputs the coupled transmitting signal and the coupled reflecting signal of the antenna 120 directly to the power detector 104 via the coupled transmitting signal output port 1011 and/or the coupled reflecting signal output port 1012.

The above step S202 may be performed by the power detector 104, in which the power detector 104 receives the coupled transmitting signal of the antenna 120 and the coupled reflecting signal of the antenna 120 from the respective output ports of the directional coupler 101, and measures the power of the transmitting signal of the antenna 120 to output an analog result to the A/D converter 105, and measures the power of the reflecting signal of the antenna 120 to output another analog result to the A/D converter 105. The above step S203 may be performed by the A/D converter 105, in which the A/D converter 105 converts the analog result as for the power of the transmitting signal of the antenna 120 into a digital result, converts the analog result as for the power of the reflecting signal of the antenna 120 into another digital result, and outputs the converted digital results to the processing unit 106. The above step S204 may be performed by the processing unit 106, in which the processing unit 106 receives the digital result as for the power of the transmitting signal of the antenna 120 to save it as a value A, and receives the digital result as for the power of the reflecting signal of the antenna 120 to save it as a value B, values A and B being stored in internal memory of the processor. The processing unit 106 further obtains the VSWR by, for example, calculating the VSWR of the antenna 120 based on the value A and the value B. For example the processing unit may subtract the value B from the value A when both of the values are in dBm, then finding the corresponding VSWR based on the difference A-B as appreciated by those skilled in art. The processing unit outputs the calculated VSWR to the feeder cable 130. Alternatively, the output unit 107 is configured to receive the VSWR from the processing unit 106, and outputs the same to the feeder cable 130 in a different frequency with frequency of the transmitting signal, for example a frequency lower than the frequency of the transmitting signal. In another embodiment, the output unit 107 may output the VSWR via a connection other than the feeder cable 130, such as another antenna cable, a separate line or a wireless connection, although it is not shown in the figure.

The above step S205 may be performed by the antenna monitoring unit 111, in which the antenna monitoring unit 111 receives the VSWR signal from the feeder cable 130, calculates a real transmitting power value of the antenna 120 on a basis of the VSWR signal, and outputs the calculated real transmitting power value to the power comparing unit 112. The above step S206 may be performed by the power comparing unit 112, in which the power comparing unit 112 compares the real transmitting power value with an expected power value to generate an error value which is a difference between the real transmitting power value and the expected power value, and outputs the error value to the transmitting power adjusting unit 113. The above step S207 may be performed by the transmitting power adjusting unit 113 and the RF transceiver 116, in which the transmitting power adjusting unit 113 generates a power adjusting signal on a basis of the error value, and outputs the power adjusting signal to the RF transceiver 116, and the RF transceiver 116 generates transmitting signals with appropriate power based on the power adjusting signal such that the transmitting power of the antenna 120 is controlled to meet the expected power.

Alternatively, the above step S205 may be performed by the antenna monitoring unit 111 and the RF/LF diplexer 114 together, in which the RF/LF diplexer 114 may be connected with the feeder cable 130, such that the measuring result, such as VSWR, of the antenna performance detecting device 100 sent via the feeder cable 130, which is a low frequency signal, is outputted through the RF/LF diplexer 114 to the antenna monitoring unit 111. The antenna monitoring unit 111 calculates a real transmitting power value of the antenna 120 on a basis of the VSWR signal, and outputs the calculated real transmitting power value to the power comparing unit 112.

Alternatively, the above step S206 may be performed by the power comparing unit 112 and the base band processing and control unit 115, in which the base band processing and control unit 115 calculates or stores in advance an expected power value of the transmitting signals of the antenna 120, and outputs the expected power value to the power comparing unit 112. The power comparing unit 112 compares the real transmitting power value with the expected power value to generate an error value, and outputs the error value to the transmitting power adjusting unit 113.

Alternatively, the above step S207 may be performed by the transmitting power adjusting unit 113, the RF transceiver 116 and the RF/LF diplexer 114 together, in which the transmitting power adjusting unit 113 generates a power adjusting signal on a basis of the error value, and outputs the power adjusting signal to the RF transceiver 116. The RF transceiver 116 is configured to generate transmitting signals with appropriate power based on the power adjusting signal such that the transmitting power of the antenna 120 is controlled to meet the expected power, and transmit such transmitting signals with appropriate power through the RF/LF diplexer 114 to the feeder cable 130.

Alternatively, the calculation of the real transmitting power value of the antenna 120 by the antenna monitoring unit 111 is further based on a value of transmitting power outputted from the base station control device 110 and a value of attenuation ratio of the connector which connects the antenna 120 and the base station control device 110. For example, given transmitting power outputted from the base station control device 110 and the attenuation value of the connector are known, the real transmitting power value of the antenna 120 may be calculated based on the transmitting power outputted from the base station control device 110, the attenuation value of the connector, and the value of the measured VSWR. The connectors may be, but not limited to, the feeder cable 130 as shown in FIG. 1 or other separate wire/line, wireless connection and the like.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system, comprising:
    a detecting device;
    a control device coupled to the detecting device, the control device comprising:
        a radio frequency/low frequency diplexer configured to extract a voltage standing wave ratio signal from signals received from the detecting device, and to output the voltage standing wave ratio signal to a monitoring device,
        the monitoring device configured to calculate a real transmitting power value of an antenna based on the voltage standing wave ratio signal received from the radio frequency/low frequency diplexer,
        a comparing device configured to compare the real transmitting power value with an expected power value to generate an error value, and
        an adjusting device configured to output a power adjusting signal for controlling the transmitting power of the antenna based on the error value.

2. The system of claim 1, wherein the control device further comprises:
    a base band processing and control device configured to output the expected power value to the comparing device.

3. The system of claim 1, wherein the control device further comprises:
    a radio frequency transceiver coupled to the adjusting device and configured to output transmitting signals with the expected power based on the power adjusting signal.

4. The system of claim 1, wherein the detecting device is configured to receive signals directly from the antenna and to obtain the voltage standing wave ratio signal of the antenna based on the received signals wherein the detecting device comprises:
    a directional coupler, connected to the antenna, configured to couple a transmitting signal and a reflecting signal of the antenna;
    a power detector configured to measure a power of the transmitting signal and the reflecting signal as analog results;
    an analog-digital converter configured to convert the analog results into digital results; and
    a processing device configured to calculate the voltage standing wave ratio signal by a difference of the digital results,
        wherein the directional couple, the power detector, the analog-digital converter, and the processing device are connected serially.

5. The system of claim 4, wherein the detecting device further comprises:
    an output device configured to output the voltage standing wave ratio signal to the control device via at least one of an antenna cable, a separate output line, and a wireless connection.

6. The system of claim 4, wherein the detecting device further comprises:
    a switch which is coupled to the directional coupler and the power detector, and the directional coupler includes a transmitting signal output port and a reflecting signal output port, wherein the power detector is configured to receive the transmitting signal in response to the switch being switched to the transmitting signal output port, and to receive the reflecting signal in response to the switch being switched to the reflecting signal output port.

7. A method, comprising:
    receiving at least one signal directly from an antenna at a detecting device;
    extracting, at a control device, a voltage standing wave ratio of the antenna from the at least one signal received at the detecting device;
    calculating real transmitting power value of the antenna based on a value of a transmitting power outputted from the control device and a value of attenuation ratio of a connector that connects the antenna and the control device;
    comparing the real transmitting power value with an expected power value to generate an error value; and
    outputting a power adjusting signal for controlling the transmitting power of the antenna based on the error value.

8. The method of claim 7, further comprising:
    generating the expected power value.

9. The method of claim 7, further comprising:
outputting transmitting signals with the expected power based on the power adjusting signal.

10. The method of claim 7, further comprising:
coupling a transmitting signal and a reflecting signal of the antenna;
measuring a power of the transmitting signal and the reflecting signal as analog results;
converting the analog results into digital results; and
calculating the voltage standing wave ratio by a difference of the digital results.

11. The method of claim 10, further comprising:
outputting the voltage standing wave ratio via at least one of an antenna cable, a separate output line, and a wireless connection.

12. A system, comprising:
a detecting device;
a control device coupled to the detecting device, the control device comprising:
a monitoring device configured to calculate a real transmitting power value of an antenna based on a value of transmitting power outputted from the control device and a value of attenuation ratio of a connector which connects the antenna and the control device,
a comparing device configured to compare the real transmitting power value with an expected power value to generate an error value, and
an adjusting device configured to output a power adjusting signal for controlling the transmitting power of the antenna based on the error value.

13. The system of claim 12, wherein the control device further comprises:
a radio frequency/low frequency diplexer configured to extract a voltage standing wave ratio signal from signals received from the detecting device, and output the voltage standing wave ratio signal to the monitoring device.

14. The system of claim 12, wherein the control device further comprises:
a base band processing and control device configured to output the expected power value to the comparing device.

15. The system of claim 12, wherein the control device further comprises:
a radio frequency transceiver coupled to the adjusting device and configured to output transmitting signals with the expected power based on the power adjusting signal.

16. The system of claim 12, wherein the detecting device is configured to receive signals directly from the antenna and to obtain the voltage standing wave ratio of the antenna based on the received signals wherein the detecting device comprises:
a directional coupler, connected to the antenna, configured to couple a transmitting signal and a reflecting signal of the antenna;
a power detector configured to measure a power of the transmitting signal and the reflecting signal as analog results;
an analog-digital converter configured to convert the analog results into digital results; and
a processing device configured to calculate the voltage standing wave ratio by a difference of the digital results, wherein the directional coupler, the power detector, the analog-digital converter, and the processing device are connected serially.

17. The system of claim 12, wherein the detecting device further comprises:
an output device configured to output the voltage standing wave ratio signal to the control device via at least one of an antenna cable, a separate output line, and a wireless connection.

18. The system of claim 12, wherein the detecting device further comprises:
a switch which is coupled to the directional coupler and the power detector, and the directional coupler includes a transmitting signal output port and a reflecting signal output port, wherein the power detector is configured to receive the transmitting signal in response to the switch being switched to the transmitting signal output port, and to receive the reflecting signal in response to the switch being switched to the reflecting signal output port.

* * * * *

UNITED STATES PATENT AND TRADEMARK OFFICE
CERTIFICATE OF CORRECTION

PATENT NO. : 8,380,239 B2  
APPLICATION NO. : 12/707523  
DATED : February 19, 2013  
INVENTOR(S) : Liu Page 1 of 1

It is certified that error appears in the above-identified patent and that said Letters Patent is hereby corrected as shown below:

In the Specifications

In Column 6, Line 13, delete "5204" and insert -- S204 --, therefor.

In the Claims

In Column 9, Line 66, in Claim 1, delete "controlling the" and insert -- controlling a --, therefor.

In Column 10, Line 29, in Claim 4, delete "couple," and insert -- coupler, --, therefor.

In Column 11, Line 22, in Claim 12, delete "a value of" and insert -- a value of a --, therefor.

Signed and Sealed this
Twenty-ninth Day of April, 2014

Michelle K. Lee
*Deputy Director of the United States Patent and Trademark Office*